June 24, 1924.
R. R. AMBLER
1,498,532
METHOD AND APPARATUS FOR COVERING AND ROLLING TIRE BEAD CORES
Filed Jan. 31, 1921
3 Sheets-Sheet 1
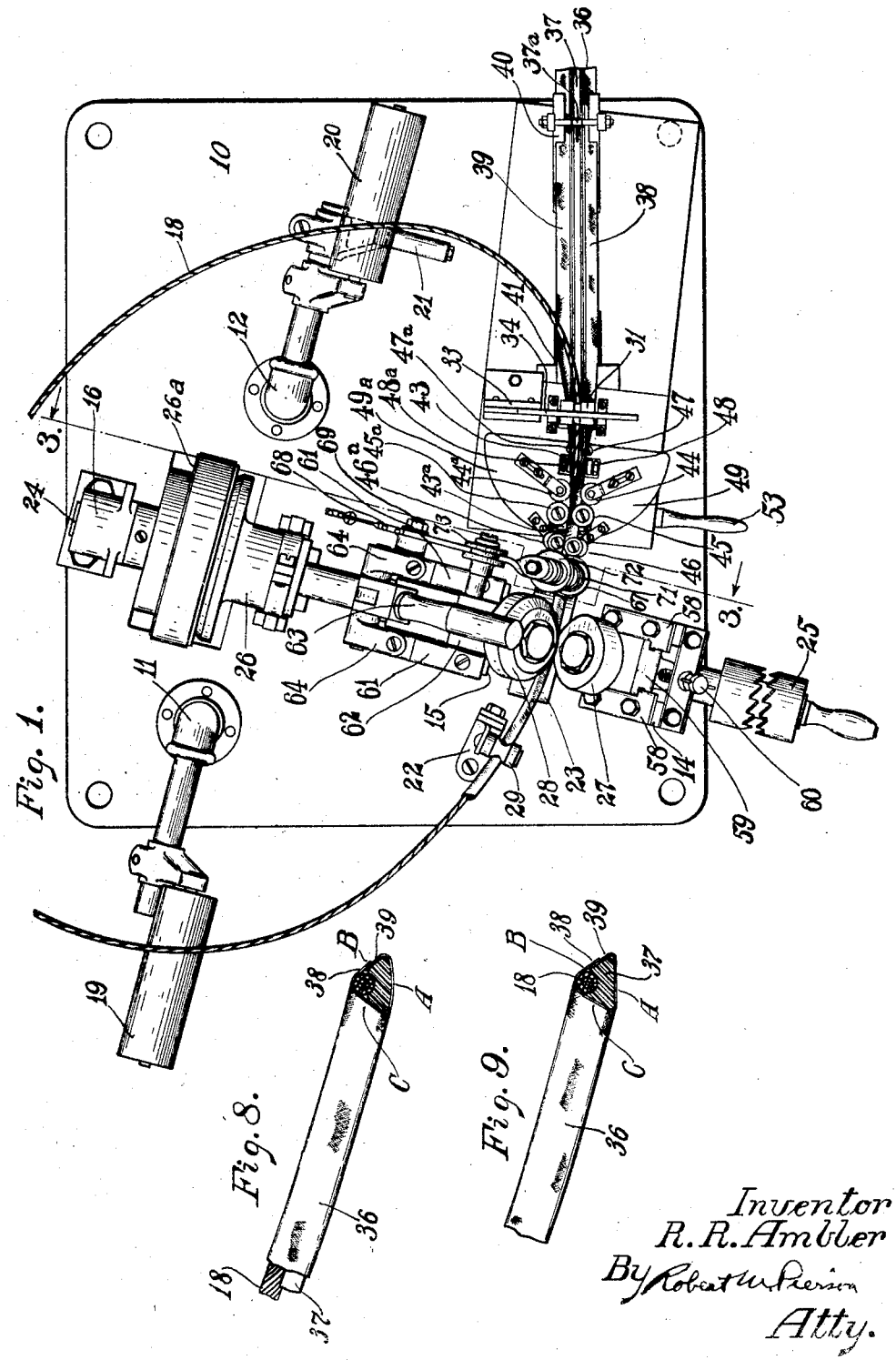
Inventor
R.R.Ambler
By Robert W. Pierson
Atty.

June 24, 1924. 1,498,532
R. R. AMBLER
METHOD AND APPARATUS FOR COVERING AND ROLLING TIRE BEAD CORES
Filed Jan. 31, 1921 3 Sheets-Sheet 2
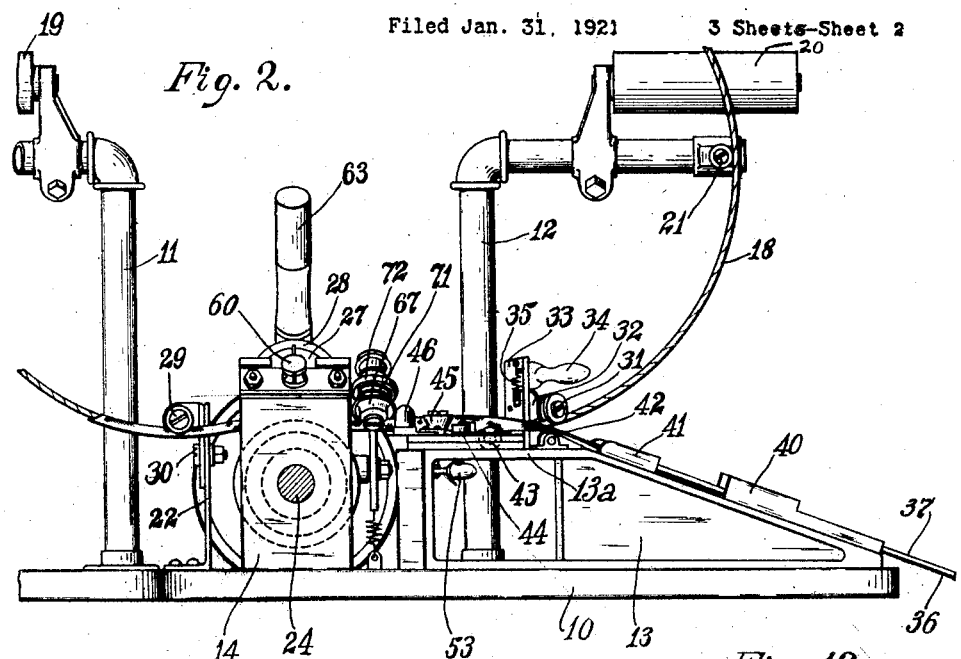
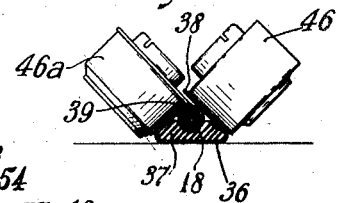
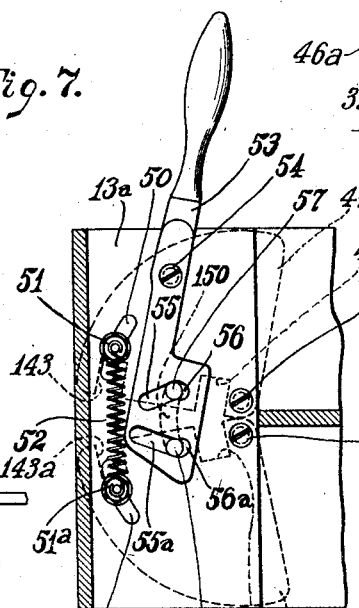
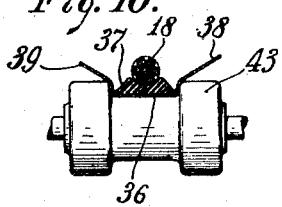
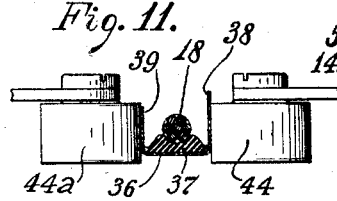
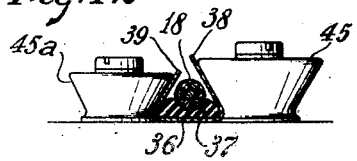
Inventor
R. R. Ambler
By Robert M. Pierson
Atty.

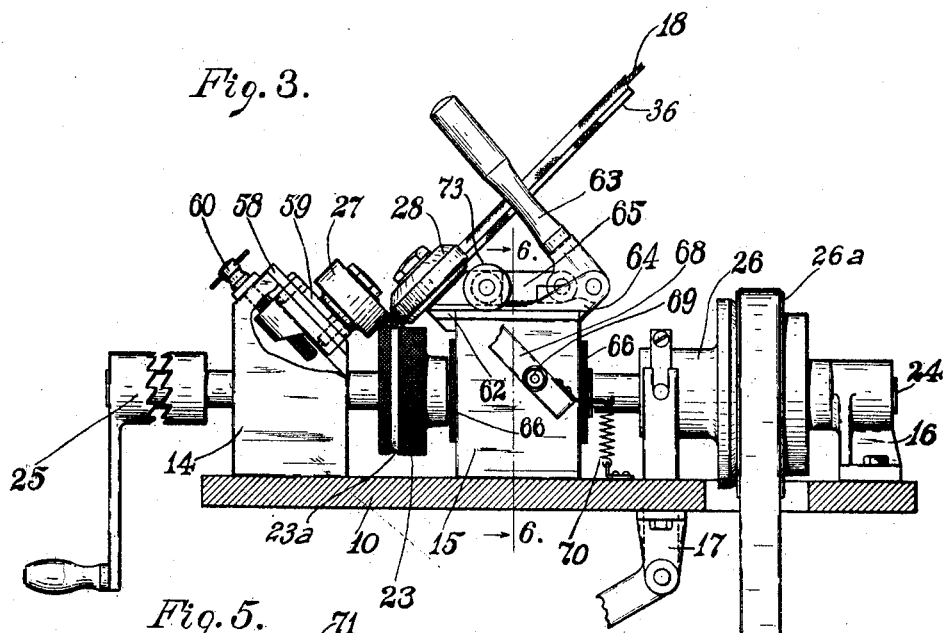
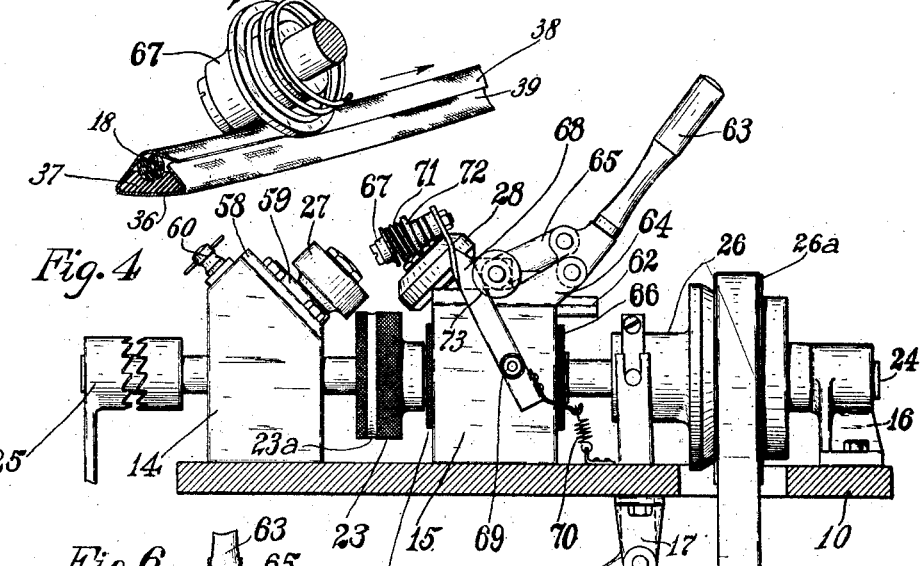
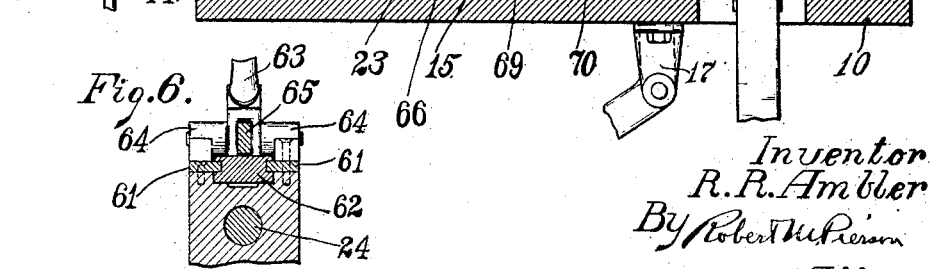

Patented June 24, 1924.

1,498,532

UNITED STATES PATENT OFFICE.

ROBERT R. AMBLER, OF AKRON, OHIO, ASSIGNOR TO THE B. F. GOODRICH COMPANY, OF NEW YORK, N. Y., A CORPORATION OF NEW YORK.

METHOD AND APPARATUS FOR COVERING AND ROLLING TIRE BEAD CORES.

Application filed January 31, 1921. Serial No. 441,290.

*To all whom it may concern:*

Be it known that I, ROBERT R. AMBLER, a citizen of the United States, residing at Akron, in the county of Summit and State of Ohio, have invented a certain new and useful Method and Apparatus for Covering and Rolling Tire Bead Cores, of which the following is a specification.

This invention relates to the covering and rolling of rings such as the bead cores for inextensible-bead pneumatic tires, comprising, for example, an inextensible member such as a cabled wire ring, a filler or inner covering material such as rubber, and an outer cover strip commonly made of rubberized fabric. In many cases it is desirable that the finished article be of uniform, triangular cross-section with one or more sharp angles, and smooth surfaced throughout, and that the wire ring, filler and cover be firmly compacted together, with the wire lying in the heel of the bead core.

The principal objects of my invention are to provide an improved method of assembling, combining and compacting the said elements into the finished product as above described, to improve the instrumentalities for covering and compacting the bead core, and to combine in one unitary apparatus a series of instrumentalities for covering the core and giving it a final smooth and sharp-cornered finish instead of employing two separate machines for this purpose as heretofore.

Of the accompanying drawings:

Fig. 1 is a plan view of a machine embodying and adapted to carry out my invention.

Fig. 2 is a front elevation of the same, partly broken away.

Fig. 3 is a sectional view on line 3—3 of Fig. 1, with parts broken away, showing, in its operative condition, the mechanism for rolling the bead-core to shape.

Fig. 4 is a similar sectional view showing the parts of said mechanism in their inoperative relation.

Fig. 5 is a perspective view on a larger scale showing the work subjected to the action of an improved cover-seam roller.

Fig. 6 is a section on line 6—6 of Fig. 3.

Fig. 7 is a reverse plan view of a roller mounting.

Figs. 8 and 9 (Sheet 1) are perspective views showing a portion of a bead-core before and after being rolled to final shape.

Figs. 10, 11, 12 and 13 are sectional views looking from left to right in Fig. 1 and showing the bottom and side members of the series of cover-folding rollers, in their relation to the work.

Referring to the drawings:

10 is a base-plate upon which are mounted the various parts including a pair of standards 11, 12, which carry the rear work-supporting rollers 19, 20; a frame member 13 which supports the strip guides and various covering rollers; a series of shaft bearings 14, 15, 16; a guide-roller bracket 22; and a downwardly-projecting shipper-lever bracket 17.

18 is a cabled-wire ring forming the inextensible element of the bead core and shown in position to be covered and rolled, the same being supported in a backwardly inclined position by the loosely-journaled rollers 19, 20. On the standard 12, adjacent the roller 20, is a small transverse roller 21 adapted to engage the inner periphery of the ring 18 and prevent the leftward displacement of the latter in its own plane.

23 is a knurled, positively-driven, work-propelling roller positioned between the bearings 14, 15 on a shaft 24 which is journalled in said bearings and in the bearing 16, said shaft being provided at its front end with a hand-turning crank 25 having a jaw-clutch hub, and further provided near its rear end with a splined, male cone-clutch member 26 coacting with a complemental member in a loose belt-pulley 26$^a$ for turning the shaft by power, the clutch member 26 being slidable into and out of clutching position by a shipper pivoted on the bracket 17.

The driven knurled roller 23, together with a pair of loosely-journaled presser rollers 27, 28, to be referred to more particularly hereinafter, are adapted to grip and draw the work circumferentially as viewed in Figs. 1 and 2, clockwise from right to left. The knurling on this roller 23 is interrupted by a peripheral groove 23$^a$ whose function is to allow the retention of a relatively thick cushion of rubber filler between the wire ring 18 and the fabric cover strip 36 hereinafter referred to, thus avoiding abrasion of the cover strip and excessive squeezing of the rubber filler from under the wire ring, which would tend to produce a concave instead of a flat-bottomed product.

29 is a grooved guide-roller, loosely journalled upon the bracket 22, for engaging the inner periphery of the covered bead-core and bending the core slightly downward as it leaves the propelling rollers, this roller being mounted on the bracket 22 which is formed in two parts secured together by a bolt 30, to permit the vertical adjustment of roller 29. 31 is a similar grooved guide-roller located anterior to the series of covering rollers and loosely journalled at the end of an arm 32 pivoted for movement in a vertical plane upon a standard 33. 34 is a locking cam-lever also pivoted for vertical movement on said standard and adapted to lock the roller 31 in a low position or to release it and permit it to be raised by a spring 35 (Fig. 2). The rollers 29 and 31, in conjunction with the supporting parts underneath the work, serve to guide the lower portion of the latter in a straightened path, which greatly facilitates the action of the ring-covering and pressing instrumentalities.

36 is a strip of rubberized fabric, preferably bias-cut adapted to form a bead-ring cover, and 37 is a filler strip of uncured rubber having a flat bottom face, a grooved upper face and sloping side faces, said strip being adhesively superimposed lengthwise upon the fabric strip 36, but being of such narrower width as to leave margins 38, 39 of the fabric extending laterally beyond it, of which the margin 38, toward the front of the machine, is preferably the wider. 37ᵃ is a check-pawl pivoted on the anterior strip-guide 40 and adapted to prevent backward movement of the fabric and filler strips. 40, 41 are the anterior and posterior strip guides mounted upon an inclined portion of the frame member 13 for keeping the laminated strip in alignment with the ring 18 as it moves onto said ring. 42 is a freely-rotatable guide-roller under the roller 31 for reducing friction on the fabric strip. 43 is a loosely-journaled, cylindrical-waisted, grooved covering roller located under the fabric strip and adapted to initiate the upward folding of the margins 38 and 39 of said strip as seen in Fig. 10. 43ᵃ is a loosely-journaled guide roller adapted to bear against the under side of the work at a more advanced position.

44, 44ᵃ, 45, 45ᵃ, and 46, 46ᵃ are pairs of loosely-journaled covering rollers mounted upon quadrant-shaped plates 49, 49ᵃ which are pivoted for horizontal movement at 47, 47ᵃ upon frame member 13, said plates being cut away at 48, 48ᵃ around the mounting of the roller 43 and also cut away at 143, 143ᵃ around the roller 43ᵃ.

The roller-carrying plates 49, 49ᵃ are adapted to be spread apart, or brought together with the rollers mounted thereon in contact with the work, by turning on the pivots 47, 47ᵃ, as indicated more clearly in the reverse plan view of Fig. 7. The horizontal table or plate 13ᵃ forming a part of the frame member 13 is provided with arcuate slots 50, 50ᵃ concentric respectively with the pivots 47, 47ᵃ. In these slots are slidably mounted studs 51, 51ᵃ secured to the plates 49, 49ᵃ respectively, said studs being connected under the plate 13ᵃ by a tension-spring 52. 53 is a laterally-disposed hand-lever pivoted at 54 on the lower side of the plate 13ᵃ and having its inner end formed with cam slots 55, 55ᵃ which are occupied by studs 57, 57ᵃ, passing through an arcuate slot 150 in the plate 13ᵃ, whereby the plates 49, 49ᵃ are operated when the lever is swung, said cam slots having terminal notch portions 56, 56ᵃ for latching the plates in their spread position.

The parallel, vertical rollers 44, 44ᵃ are of cylindrical form and are adapted to turn the margins 38 and 39 of the fabric strip vertically upward as seen in Fig. 11. The next pair of rollers 45, 45ᵃ, which are also mounted on parallel, vertical axes, have the general form of inverted truncated cones with shallow flanges at their lower ends, and they serve to turn the margins of the fabric strip over toward an apex, around the filler and the wire ring, as seen in Fig. 12, their lower portions being driven by the work and their upper portions moving faster than the travel of the margins of the cover strip with which they contact, so as to exert a forward-wiping action on said margins, tending to prevent the formation of wrinkles in the cover.

The next pair of rollers, 46, 46ᵃ are of general cylindrical form and are journaled upon axes inclined upwardly and inwardly, these rollers serving to press the fabric margins 38, 39 firmly against the side walls of the filler and against the ring 18 lying in the groove of the latter so as to cause said margins to adhere to the filler and wire ring. The roller 46 which engages the wider margin of the cover strip is positioned slightly beyond the roller 46ᵃ engaging the narrower margin, so that the overlapping of the wider upon the narrower margin may be facilitated, and roller 46ᵃ is formed with a shallow radial flange at its top adapted to intensify the pressure upon the narrower fabric margin 39 at the latter's edge and insure the adhesion of said edge to the wire ring.

The bearing 14 is provided upon its upper surface with guides 58, 58 sloping at an angle of approximately 45° downward toward the roller 23, and between said guides is mounted a slide 59 on which is journaled the work-feeding presser roller 27, on an axis at right-angles to the guides. The slide 59 is provided with a swiveled hand-screw 60 for adjusting the position of the roller 27 with reference to the rollers 23 and 28.

On top of the bearing 15 are located a pair of horizontal guides 61, 61 between which is mounted a slide 62 carrying the work-feeding presser roller 28 on an axis at about 45° to the slide. 63 is a hand-lever fulcrumed in brackets 64, 64, and 65 is a link connecting said lever with the slide 62, whereby the roller 28 may be projected into and withdrawn from its operative position, to close and open the bead-core receiving space, and thereby allow the three rollers 23, 27 and 28 to act upon the work or to release it and permit it to be removed upwardly from the working space. These three rollers preferably have cylindrical working faces, as shown, which define a working space of substantially the desired cross-sectional shape of the finished bead-core, which in this case is approximately that of a right-angled triangle with its right angle on the inner side of the ring at the edge which is to form the heel of the bead core. It will be noted that the axes of the rollers 27 and 28 are located at angles of approximately 45° to the axis of the knurled roller 23, that the roller 27 is adapted to be adjusted in a direction 90° from its own axis and 45° from that of the knurled roller, and that the roller 28 is adapted to be adjusted in a direction 45° from its own axis and parallel with the axis of the knurled roller. The roller 23 is adapted to be adjusted along its own axis by shifting the shaft 24 lengthwise by means of a pair of threaded thrust collars 66 mounted in the bearing block 15.

The working surfaces of the three rollers, 23, 27 and 28 form a triangular, substantially-closed, work-receiving space, the working surface of each roller extending transversely across the end of the working surface of the next roller, and said rollers are adapted to be adjusted relatively to each other to vary the size of the work-receiving space while keeping it substantially closed, said rollers, being of cylindrical form, are adapted to exert normal rolling pressure against the respective sides of the work, as distinguished from the wiping action of certain of the cover applying rollers, so that, the work receiving space being substantially closed, the work is compacted by direct, normal pressure at all points around its cross-sectional contour.

67 is a flanged, spring-tensioned roller loosely journaled and axially slidable upon a stud shaft mounted at the upper end of an arm 68, the latter being pivoted to the side of the journal block 15 at 69, and its lower end being connected by a tension-spring 70 with the base-plate 10, said spring being adapted yieldingly to retract the flared roller 67 from operative position. The function of this roller is to compress the seam formed by the overlapped margins of the cover strip. 71 is a compression spring surrounding the shaft of the flanged roller 67 and interposed between said roller and a rotary flanged collar 72 also loosely mounted upon said shaft adjacent its connection with the arm 68, said collar and spring being adapted to exert an axial thrust upon the flanged roller 67 in the direction of the work and to afford a frictional drag upon the free rotation of said roller. 73 is a grooved roller loosely journaled upon the side of the slide 62 adjacent the arm 68, and adapted to engage the latter in its groove, and by a cam-like action depress it into operative position, against the action of the spring 70, when the slide 62 is moved toward the work by movement of the hand-lever 63.

In the operation of the machine, the hand-lever 63 is moved to the right as viewed in Fig. 4, in order to retract the rollers 28 and 67 and thereby open the working space defined by the rollers 23, 27 and 28, for the insertion of a cable ring. The hand-lever 53 is moved to the right, as viewed in Fig. 1, whereby the plates 49, 49ª, carrying the three pairs of side-acting cover-folding rollers, are swung apart and automatically latched as previously described. The locking cam-lever 34 is raised to release the arm carrying the anterior ring-guiding roller 31 and permit it to be elevated by its spring. A cabled wire ring 18 is then placed in position, as shown in Figs. 1, 2 and 3, with its lower portion inserted under the rollers 29 and 31, and the leading end of the laminated cover and filler strip 36, 37 is pulled up to the ring 18 at a point between the roller 31 and the roller 43 and fastened to said ring by hand. The ring 18 is usually covered with tacky rubber cement and the filler and cover strips readily adhere thereto when folded around and pressed against it. The roller 31 is then moved to its lower position and locked there by bringing down the cam lever 34 and by this action the section of ring extending through the series of working rollers is bent from its normally arcuate form to an approximately straight form. The plates 49, 49ª carrying the rollers 44, 45, 46 and 44ª, 45ª and 46ª are then released by moving the hand-lever 53 to the left, as viewed in Figs. 1 and 2, and said rollers are yieldingly closed upon the work by the action of the spring 52. Additional pressure of the rollers upon the work may be supplied through the action of the outer sides of the cam slots 55, 55ª, upon the studs 57, 57ª, by pushing the handle of lever 53 further to the left. The hand-lever 63 is then swung to the left as viewed in Fig. 3, to the position there shown, bringing the roller 28 into position to press the work against the rollers 27 and 23, and said roller 28 is held in such position by the weight of the hand-lever 63 and the toggle action of the same with its link 65. This operation also brings the seam-compressing roller 67 down into its operative position as shown in Fig. 5. The shaft 24 is then revolved counter-clockwise, as viewed in Fig. 2, either by means of the hand-crank 25 or by applying power through the clutch member 26 and pulley 26ª. Because of the straightened condition of its lower portion, the wire ring 18 bears heavily upon the knurled roller 23, and is drawn by the latter through the machine, bringing with it the filler and cover strips which are automatically wrapped about it, and the lap of the cover-seam formed, by the several rollers up to and including the pair of rollers 46, 46ª.

It may here be observed that my invention does not lie in the general combination of bead-core propelling, straightening and covering devices or in the described specific character of said covering devices up to the point just mentioned, and it will be understood that any suitable instrumentalities may be employed for effecting such general combination and performing the bead-covering function, so far as consistent with the new series of steps, combinations of mechanism and specific instrumentalities which constitute my invention as set forth in the claims.

The flanged roller 67 now turns or folds the cover-strip margin 38 over the apex of the bead and its radial flange rolls said margin down upon the opposite side with a wiping action to form a lapped seam with the margin 39. The roller 67 may be so positioned, by tilting the rear end of its axis backward at slightly less than a right-angle to the direction of travel of the work, that the pressure of its radial flange in the descending or on-running part of its orbit will be relatively great, and relatively light in the ascending or off-running part, so that the wiping action of said flange will be principally downward, toward the edge of the top ply. This will be understood by reference to Fig. 5, in which the arrows show the direction of rotation of the roller and the direction of travel of the work. The rollers 23, 27 and 28, by their forming and compacting action against the work, then roll the latter from substantially the form shown in Fig. 8 to substantially that shown in Fig. 9, having more sharply-defined angles at the two corners where the outer face or hypotenuse A of the triangle (which is to lie on the inner side of the tire casing) joins the base or substantially cylindrical face B of the bead core and the substantially radial face C thereof, this forming and compacting action having the effect of flowing the filler 37 into said corners and around the wire ring 18, and flattening and smoothing the bead core on all sides.

The use of these forming and compacting rollers, or any suitable equivalent, as work-feeders in conjunction with ring-covering and ring-straightening devices (either or both) as well as the combination of steps in the method performed by the said instrumentalities and the described mode of constructing, mounting and combining the said rollers, and the seam-pressing roller, are believed to be novel. The details may be varied without departing from the scope of my invention.

By straightening the portion of the ring where the cover is to be applied the latter may be introduced to the ring at one side of the latter's crown, where the greater part of the filler is destined to lie, and the cover strip may be folded about the ring without bending the covering material in a direction oblique to its own plane as would be necessary in applying the covering material at one side of the crown on a curved portion of the ring. As the filler and cover are thoroughly compacted against the ring and the cover folded into place without wrinkles while the underlying portion of the ring is straightened, the latter may then be permitted to resume its normal curved form without such irregularities of structure, as would result if the ring were not straightened.

I claim:

1. The method of forming inextensible beads for pneumatic tires which comprises circumferentially rotating an inextensible ring, progressively applying longitudinally thereto a cover strip and plastic filler material, progressively folding said strip laterally about said ring and filler material, and simultaneously at a covered point on the ring applying simple, longitudinally progressing, rolling pressure, substantially without transverse wiping action, simultaneously against said cover at substantially all points around a cross-section thereof to shape it.

2. The method of forming inextensible beads for pneumatic tires which comprises progressively applying a longitudinal cover strip and a filler to an inextensible ring, and propelling the covered ring, as well as shaping and compacting the covering thereof, in a triangular cross-sectional form by applying simple, longitudinally progressing, rolling pressure, substantially without transverse wiping action simultaneously against said cover at substantially all points around a cross-section thereof.

3. The herein-described method which comprises progressively straightening a portion of an inextensible, flexible ring, progressively applying on said straightened portion a covering strip, and propelling the covered ring, as well as compacting the covering thereof in a triangular cross-sectional form, by the action of propelling devices which exert pressure simultaneously against said covering at substantially all points around a cross-section of said straightened portion.

4. The method of forming inextensible bead cores for pneumatic tires which comprises progressively straightening successive portions of an inextensible, flexible ring, applying an inner filler and an outer cover strip to said ring on the straightenend portion thereof, folding the cover strip about said portion and propelling said ring circumferentially by rolling pressure exerted laterally thereof from three directions simultaneously, on its straightened and covered portion, so as also to compact the ring-covering in an approximately triangular cross-sectional form.

5. A bead core rolling mechanism comprising rollers whose working surfaces form a substantially closed work-receiving space, the working surface of each roller extending across the end of the working surface of the next roller, and means for adjusting said rollers relatively to each other to vary the size of the work-receiving space while keeping it substantially closed.

6. A bead core rolling mechanism comprising three rollers whose working surfaces form a triangular, substantially closed work-receiving space, the working surface of each roller extending across the end of the working surface of the next roller, and means for adjusting said rollers relatively to each other to vary the size of the work-receiving space while keeping it substantially closed.

7. A bead core rolling mechanism comprising a set of cylindrical rollers whose cylindrical faces define a substantially closed work-receiving space, the working face of each roller extending beyond the end of the working face of the next roller, and means for adjusting said rollers relatively to each other to vary the size of the work receiving space while keeping it substantially closed.

8. In apparatus for rolling inextensible beads the combination of a knurled work driving roller formed with a circumferential groove adapted to underlie the inextensible re-enforcing member of the bead, and means for pressing the bead against said roller.

9. A bead-rolling mechanism comprising three rollers formed with substantially cylindrical faces, and means for simultaneously pressing said faces against a bead core at approximately the same cross-section thereof.

10. A bead-rolling mechanism comprising means for supporting an endless bead core in a plane and holding it against movement of translation while permitting it to rotate circumferentially, three rollers formed with substantially cylindrical faces and including a positively-driven roller, and means for simultaneously pressing said faces against said bead core at approximately the same cross-section thereof to propel said bead core circumferentially between said rollers under pressure of said cylindrical faces.

11. A bead-core-rolling mechanism comprising three rollers formed with substantially cylindrical working surfaces, said rollers being journaled on axes lying in substantially the same plane but all at different angles, means for adjusting said rollers toward and from each other in said plane, and means for driving one or more of said rollers.

12. A bead-core rolling mechanism comprising a roller formed with a substantially cylindrical working surface, means for adjusting said roller axially, a second roller formed with a cylindrical working surface and journaled on an axis lying in the same plane but at an angle to that of the first roller, means for adjusting said second roller in said plane and approximately at right-angles to its own axis, a third roller formed with a cylindrical working surface and journaled on an axis lying in the same plane but at an angle to the axis of the first roller, means for adjusting said third roller in said plane and in a direction approximately parallel with the axis of the first roller, and means for driving one or more of said rollers.

13. A bead-core rolling mechanism comprising a roller formed with a substantially cylindrical working surface, a second roller formed with a cylindrical working surface and journaled on an axis lying in the same plane but at an angle to that of the first roller, a third roller formed with a cylindrical working surface and journaled on an axis lying in the same plane but at an angle to that of the first roller, means for adjusting said third roller in said plane and in a direction approximately parallel with the axis of the first roller, said means comprising a slidable bearing for said third roller, a hand-lever, and a link connecting said bearing with said hand-lever and with the latter constituting a toggle.

14. In a bead-core rolling machine, the combination of devices for rotatively supporting a ring, and for progressively straightening a portion thereof, and means acting on the straightened portion for circumferentially propelling and compacting the ring, said means including a group of three rollers forming a triangular work-receiving space and adapted to compress the ring simultaneously in three directions.

15. A bead-core rolling mechanism comprising means for supporting a bead-core ring in a plane and holding it against movement of translation while permitting it to travel circumferentially, three work-feeding rollers having substantially cylindrical faces and including a positively-driven roller, means for simultaneously pressing said rollers against the ring at approximately the same cross-section thereof, and means for holding a portion of said ring approximately straight as it passes between said rollers.

16. In a machine for covering and rolling bead-core rings, the combination of means for progressively applying a covering strip longitudinally to a ring, folding it transversely about said ring and lapping the edges of said strip to form a seam, and a group of rollers having cylindrical working faces, apart from said means, defining a substantially closed work-receiving space and adapted for circumferentially propelling, laterally shaping, and compacting the covered ring.

17. In a machine for covering and shaping bead-core rings, the combination of means for rotatively supporting an annular core member and for progressively straightening a portion thereof, means for progressively applying a filler and a cover in strip form to said straightened portion, means for progressively folding said cover about said filler and core member, means comprising three rollers adapted to exert lateral pressure on the straightened and covered portion of said member from three directions at substantially the same cross-section thereof, and means for positively rotating one of said rollers.

18. In a machine for covering and rolling bead-cores of triangular section, the combination of a series of rollers adapted to apply a filler and a cover to a bead-ring as it is drawn through said series, a drive roller adapted to draw said ring through said series and formed with a surface adapted to shape one face of the covered ring, and a plurality of pressure rollers cooperatively associated with said drive-roller and having their axes at an angle to each other and to that of said drive-roller for shaping the other two faces of said covered ring.

19. In a machine for covering and rolling bead-core rings, the combination of means for progressively applying a covering strip longitudinally to a wire ring, folding it transversely about said ring, and lapping the edges of said strip to form a seam, a seam-pressing roller, and a group of rollers located beyond said seam-pressing roller for circumferentially propelling and laterally shaping and compacting the covered ring.

20. In a machine for covering and rolling bead-core rings, the combination of a seam-pressing roller, a group of ring-gripping rollers, means for retracting one of the latter to open the space between them for the insertion and removal of the work, and a connection between said retractible roller and seam-roller for producing conjoint movement of the two.

21. In a bead-core covering and rolling machine, the combination of means for progressively wrapping a cover strip about a ring and lapping its edges in a longitudinal seam on the inner side of the ring, a roller adapted to overlie said inner side and press the seam, a posterior group of rollers for feeding the ring and compressing the cover thereon, a lever for retracting one of said group to open the space between them for insertion and removal of the work, and a connection between said lever and support for retracting and projecting the seam pressing roller when said lever receives its retracting and projecting movements.

In witness whereof I have hereunto set my hand this 22nd day of January, 1921.

ROBERT R. AMBLER.